US011481872B2

(12) United States Patent
Guo et al.

(10) Patent No.: US 11,481,872 B2
(45) Date of Patent: Oct. 25, 2022

(54) METHOD AND DEVICE FOR LOADING IMAGE

(71) Applicant: BEIJING BAIDU NETCOM SCIENCE AND TECHNOLOGY CO., LTD., Beijing (CN)

(72) Inventors: Wubiao Guo, Shanghai (CN); Xiangli Chen, Shanghai (CN); Cijiao Hu, Shanghai (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/762,818

(22) PCT Filed: May 7, 2019

(86) PCT No.: PCT/CN2019/085785
§ 371 (c)(1),
(2) Date: Sep. 24, 2020

(87) PCT Pub. No.: WO2020/007113
PCT Pub. Date: Jan. 9, 2020

(65) Prior Publication Data
US 2021/0012455 A1     Jan. 14, 2021

(30) Foreign Application Priority Data
Jul. 6, 2018   (CN) .......................... 201810739667.1

(51) Int. Cl.
*G06T 3/40*     (2006.01)
*G06T 7/10*     (2017.01)

(52) U.S. Cl.
CPC . *G06T 3/40* (2013.01); *G06T 7/10* (2017.01)

(58) Field of Classification Search
CPC .................................... G06T 3/40; G06T 7/10
See application file for complete search history.

(56) References Cited

U.S. PATENT DOCUMENTS

2003/0137586 A1   7/2003   Lewellen
2005/0010638 A1*  1/2005   Richardson ............. H04L 47/70
                                                          709/204
(Continued)

FOREIGN PATENT DOCUMENTS

CN     101320247 A     12/2008
CN     104850585 A     8/2015
(Continued)

OTHER PUBLICATIONS

"Research on the Technology of Panorama Acquisition and Display" with English abstract, 2013, 12 pages.
(Continued)

*Primary Examiner* — Yi Yang
(74) *Attorney, Agent, or Firm* — Seed IP Law Group LLP

(57) ABSTRACT

A method and apparatus for loading an image, where the method includes acquiring a viewport size of a target apparatus, and a scale of an image displayed on the target apparatus with respect to an original size of the image; in a predetermined image set to be displayed, determining, an image to be displayed matching the viewport size and the scale, as a target image to be displayed; and loading the target image to be displayed.

20 Claims, 8 Drawing Sheets

(56) References Cited

U.S. PATENT DOCUMENTS

| | | | |
|---|---|---|---|
| 2007/0206275 A1* | 9/2007 | Hemmer | G02B 21/0024 359/385 |
| 2010/0040299 A1* | 2/2010 | Noh | H04N 19/59 382/233 |
| 2013/0258136 A1* | 10/2013 | Lee | H04N 5/232 348/231.99 |
| 2013/0268883 A1* | 10/2013 | Kim | G06F 3/04847 715/784 |
| 2013/0321461 A1 | 12/2013 | Filip | |
| 2014/0055478 A1* | 2/2014 | Thakkar | G06T 1/60 345/565 |
| 2015/0012514 A1* | 1/2015 | Yan | G06F 16/951 707/706 |
| 2015/0058797 A1 | 2/2015 | Kim et al. | |
| 2015/0350737 A1* | 12/2015 | Anderson | G06F 40/169 348/564 |
| 2016/0065981 A1 | 3/2016 | Wee et al. | |
| 2016/0105608 A1* | 4/2016 | Pettegrew | H04N 5/23229 348/37 |
| 2016/0180567 A1* | 6/2016 | Lee | G06F 3/048 345/473 |

FOREIGN PATENT DOCUMENTS

| | | |
|---|---|---|
| CN | 105511712 A | 4/2016 |
| CN | 105554554 A | 5/2016 |
| CN | 106780319 A | 5/2017 |
| CN | 107093164 A | 8/2017 |
| CN | 108961165 A | 12/2018 |

OTHER PUBLICATIONS

Extended European Search Report for European Application No. 19830730.8, dated Jun. 9, 2022, 10 pages.

Perpeet et al., "Engineering the Ideal Gigapixel Image Viewer," Jan. 2011, 6 pages.

* cited by examiner

METHOD AND DEVICE FOR LOADING IMAGE

This patent application is a US National Stage of International Application No. PCT/CN2019/085785, filed May 7, 2019, which claims the priority of Chinese Application No. 201810739667.1, filed on Jul. 6, 2018 by Beijing Baidu Netcom Science and Technology Co., Ltd., entitled "Method and Device for Loading Image," the entire disclosure of which is hereby incorporated by reference.

TECHNICAL FIELD

Embodiments of the present disclosure relate to the field of computer technology, and specifically to a method and apparatus for loading an image.

BACKGROUND

At present, sizes of electronic devices are developed in a trend of diversity. For electronic devices of different sizes, the viewport sizes of the electronic devices are also typically different. Here, a viewport may be related to the screen of an electronic device, or may be related to the window size presented by the electronic device.

In addition, when the electronic device presents an image, a user may perform operations such as shrinking, magnifying, dragging and full-screen display on the image presented by the electronic device.

In the existing technology, images presented before and after a scaling operation or images presented on electronic devices of different viewport sizes generally refer to the same image.

SUMMARY

Embodiments of the present disclosure provide a method and apparatus for loading an image.

In a first aspect, an embodiment of the present disclosure provides a method for loading an image, including: acquiring a viewport size of a target device, and a scaling ratio of an image presented on the target device with respect to an original dimension of the image; determining, in a predetermined to-be-presented image set, a to-be-presented image matching the viewport size and the scaling ratio as a target to-be-presented image; and loading the target to-be-presented image.

In some embodiments, the to-be-presented image set is determined by: acquiring a target image; performing a scaling process on the target image to obtain at least one scaled image; and performing image segmentation on a scaled image in the at least one scaled image to obtain the to-be-presented image set.

In some embodiments, the target image includes an interior view image of a target object and an exterior view image group of the target object, the interior view image is an equidistant cylindrical projection image obtained by photographing around the target object and stitching images obtained through the photographing, and the exterior view image group is obtained by photographing the target object using a panoramic camera.

In some embodiments, a size of each exterior view image in the exterior view image group and a size of the interior view image are respectively predetermined.

In some embodiments, the performing a scaling process on the target image to obtain at least one scaled image includes: performing the scaling process on the each exterior view image and the interior view image respectively according to at least one preset scaling ratio, to obtain the at least one scaled image, and the performing image segmentation on a scaled image in the at least one scaled image to obtain the to-be-presented image set includes: performing the image segmentation on each scaled image in the at least one scaled image respectively according to a preset size, to obtain the to-be-presented image set.

In some embodiments, the loading the target to-be-presented image includes: loading the target to-be-presented image from a cache and presenting the target to-be-presented image.

In some embodiments, the method further includes: in response to detecting a target operation for the target to-be-presented image, re-determining, in the to-be-presented image set, a to-be-presented image as the target to-be-presented image based on the target operation, wherein the target operation comprises at least one of: an image switching operation, an image dragging operation, an image scaling operation, or a full screen triggering operation.

In some embodiments, the method further includes: presenting a transition animation before loading of the re-determined target to-be-presented image is completed; and presenting the re-determined target to-be-presented image.

In some embodiments, the method further includes: in response to detecting an information triggering operation for an area image in the target to-be-presented image, presenting predetermined image information of the area image.

In some embodiments, to-be-presented images in the to-be-presented image set are stored in a predetermined format.

In a second aspect, an embodiment of the present disclosure provides an apparatus for loading an image, including: an acquiring unit, configured to acquire a viewport size of a target device, and a scaling ratio of an image presented on the target device with respect to an original dimension of the image; a determining unit, configured to determine, in a predetermined to-be-presented image set, a to-be-presented image matching the viewport size and the scaling ratio as a target to-be-presented image; and a loading unit, configured to load the target to-be-presented image.

In some embodiments, the to-be-presented image set is determined by: acquiring a target image; performing a scaling process on the target image to obtain at least one scaled image; and performing image segmentation on a scaled image in the at least one scaled image to obtain the to-be-presented image set.

In some embodiments, the target image includes an interior view image of a target object and an exterior view image group of the target object, the interior view image is an equidistant cylindrical projection image obtained by photographing around the target object and stitching images obtained through the photographing, and the exterior view image group is obtained by photographing the target object using a panoramic camera.

In some embodiments, a size of each exterior view image in the exterior view image group and a size of the interior view image are respectively predetermined.

In some embodiments, the performing a scaling process on the target image to obtain at least one scaled image includes: performing the scaling process on the each exterior view image and the interior view image respectively according to at least one preset scaling ratio, to obtain the at least one scaled image, and the performing image segmentation on a scaled image in the at least one scaled image to obtain the to-be-presented image set includes: performing the image segmentation on each scaled image in the at least one scaled image respectively according to a preset size, to obtain the to-be-presented image set.

In some embodiments, the loading unit is further configured to: load the target to-be-presented image from a cache and present the target to-be-presented image.

In some embodiments, the apparatus further includes: a re-determining unit, configured to, in response to detecting a target operation for the target to-be-presented image, re-determine, in the to-be-presented image set, a to-be-presented image as the target to-be-presented image based on the target operation, where the target operation includes at least one of: an image switching operation, an image dragging operation, an image scaling operation, or a full screen triggering operation.

In some embodiments, the apparatus further includes: a first presenting unit, configured to present a transition animation before loading of the re-determined target to-be-presented image is completed; and a second presenting unit, configured to present the re-determined target to-be-presented image.

In some embodiments, the apparatus further includes: a third presenting unit, configured to present, in response to detecting an information triggering operation for an area image in the target to-be-presented image, predetermined image information of the area image.

In some embodiments, to-be-presented images in the to-be-presented image set are stored in a predetermined format.

In a third aspect, an embodiment of the present disclosure provides an electronic device for loading an image, including: one or more processors; and a storage apparatus, configured to store one or more programs, where the one or more programs, when executed by the one or more processors, cause the one or more processors to implement the method according to any embodiment in the above method for loading an image.

In a fourth aspect, an embodiment of the present disclosure provides a computer readable medium, storing a computer program, where the program, when executed by a processor, implements the method according to any embodiment in the above method for loading an image.

According to the method provided in the embodiments of the present disclosure, the viewport size of the target device and the scaling ratio of the image presented on the target device with respect to the original dimension of the image are first acquired. Then, in the predetermined to-be-presented image set, the to-be-presented image matching the viewport size and the scaling ratio is determined as the target to-be-presented image. Finally, the target to-be-presented image is loaded. Thus, the forms of loading the image are enriched, which helps to improve the loading speed of the image under the premise that the resolution of the image is ensured.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant disclosure, rather than limiting the disclosure. In addition, it should be noted that, for ease of description, only parts related to the relevant invention are shown in the accompanying drawings.

It should also be noted that embodiments in the present disclosure and the features in the embodiments may be combined with each other on a non-conflict basis. The present disclosure will be described below in detail with reference to the accompanying drawings and in combination with the embodiments.

Figure 1:
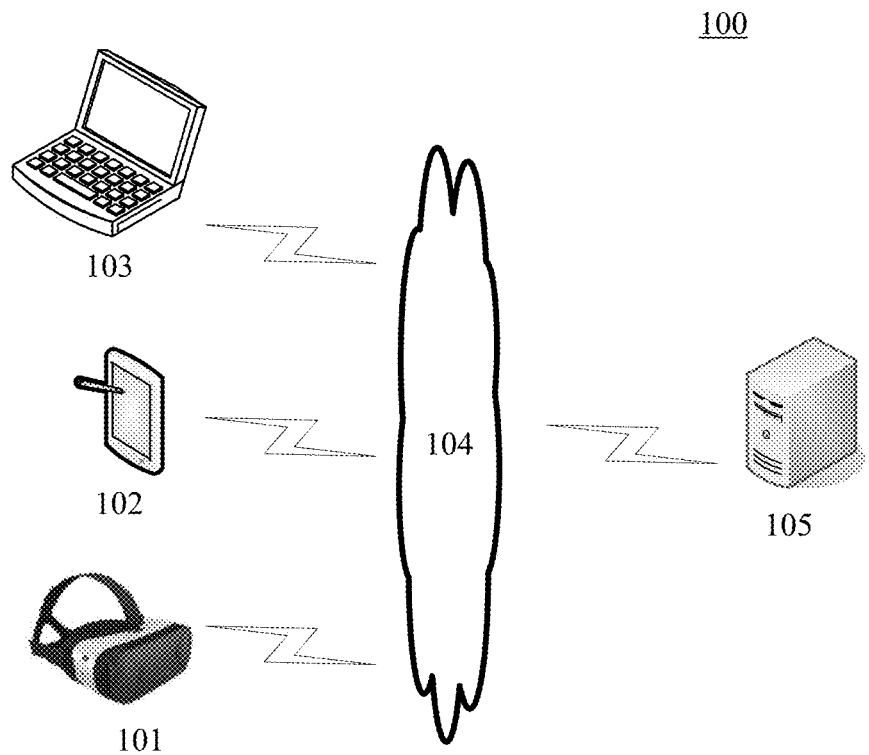
FIG. 1 is a diagram of an exemplary system architecture in which an embodiment of the present disclosure may be applied.

FIG. 1 shows an exemplary system architecture 100 in which an embodiment of a method for loading an image or an apparatus for loading an image according to embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send an image. Various client applications, such as an image collection application, a web browser application, a shopping application, a search application, an instant communication tool, a mailbox client and social platform software, may be installed on the terminal devices 101, 102 and 103.

The terminal devices 101, 102 and 103 may be hardware or software. When the terminal devices 101, 102 and 103 are the hardware, the terminal devices 101, 102 and 103 may be various electronic devices having a display screen and supporting image browsing, the electronic devices including, but not limited to, a virtual reality (VR) device, a smart phone, a tablet computer, an e-book reader, an MP3 player (Moving Picture Experts Group Audio Layer III), an MP4 (Moving Picture Experts Group Audio Layer IV) player, a laptop portable computer, a desktop computer, etc. When the terminal devices 101, 102 and 103 are the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend image processing server providing support for the image displayed on the terminal devices 101, 102 and 103. The backend image processing server may process (e.g., analyze) data such as a received image processing request (e.g., an image loading request, an image scaling request, an image switching request, an image dragging request, an image full-screen presenting request), and feedback the processing result (e.g., the loaded image) to the terminal devices.

It should be noted that the method for loading an image provided by the embodiments of the present disclosure may be performed by the server 105, or may be performed by the terminal devices 101, 102 and 103. Correspondingly, the apparatus for loading an image may be provided in the server 105, or may be provided in the terminal devices 101, 102 and 103.

It should be noted that the server may be hardware or software. When the server is the hardware, the server may be implemented as a distributed server cluster composed of a plurality of servers, or as a single server. When the server is the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks and servers may be provided based on actual requirements. When the electronic device on which the method for loading an image runs does not need to perform a data transmission with other external devices, the system architecture may not include the network, and other electronic devices other than the executing body of the method for loading an image.

Figure 2:
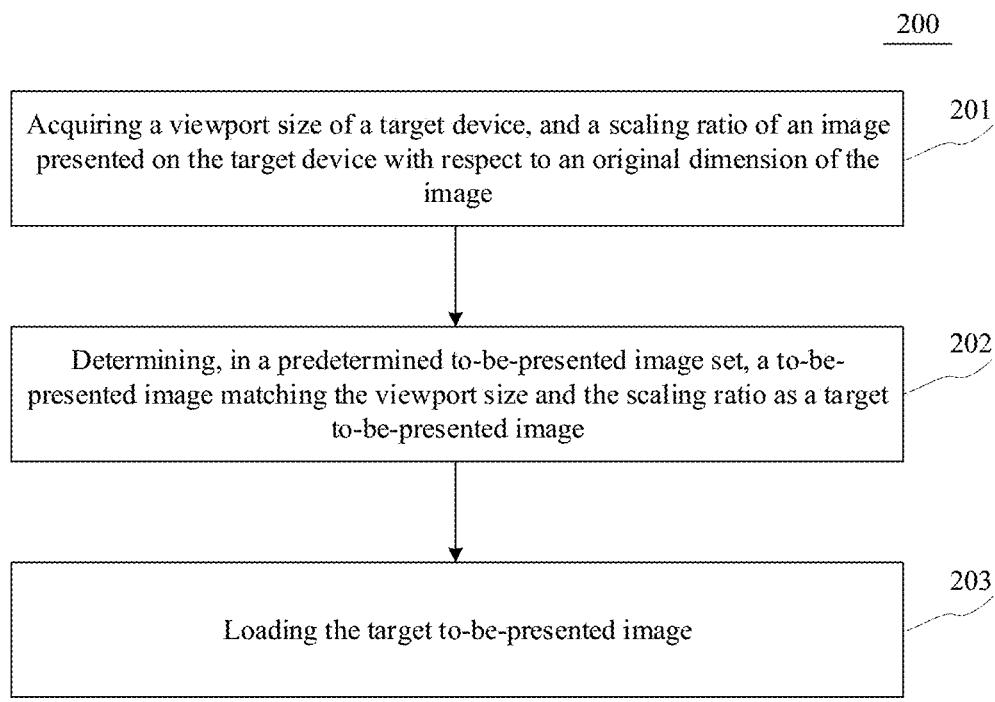
FIG. 2 is a flowchart of an embodiment of a method for loading an image according to the present disclosure.

Further referring to FIG. 2, FIG. 2 illustrates a flow 200 of an embodiment of a method for loading an image according to the present disclosure. The method for loading an image includes the following steps.

Step 201, acquiring a viewport size of a target device, and a scaling ratio of an image presented on the target device with respect to an original dimension of the image.

In this embodiment, an executing body (e.g., the server or the terminal devices shown in FIG. 1) of the method for loading an image may acquire the viewport size of the target device and the scaling ratio of the image presented on the target device with respect to the original dimension of the image, by means of a wired connection or a wireless connection. When the above executing body is a terminal device, the above executing body may acquire the viewport size of the executing body (i.e., the target device) and the scaling ratio of the image presented on the executing body (i.e., the target device) with respect to the original dimension of the image from the executing body itself (i.e., the target device). When the above executing body is a server, the above executing body may acquire, from a terminal device (i.e., the target device) communicated with the executing body, the viewport size of the terminal device (i.e., the target device) communicated with the executing body and the scaling ratio of the image presented on the terminal device (i.e., the target device) communicated with the executing body with respect to the original dimension of the image.

In this embodiment, the target device may be the executing body itself, or may be other devices communicated with the executing body. The viewport size may be related to the screen of the electronic device, or may be related to the window size presented by the electronic device. The target device may be a device for interacting with a user.

In practice, when the viewport size is related to the screen of the electronic device, each electronic device (e.g., the above target device) may correspond to a device model number, and the electronic device of each model number may correspond to a viewport size. The viewport size of the above electronic device and the viewport size of this electronic device may be associated and stored in a database or a table, and thus, the executing body may acquire the above viewport size from the above database or table. Alternatively, the executing body may also directly acquire the viewport size of the target device from the target device.

Here, the original dimension of the image may be determined by HTML5 (HyperText Markup Language 5). For example, the original width and the original height (i.e., the original dimension) of the image may be acquired through the naturalWidth property or the naturalHeight property of HTML5. Alternatively, the original dimension of the stored image may be directly acquired by the above executing body. The above scaling ratio may be a scaling ratio of the image currently presented on the target device with respect to the original dimension of the image. In practice, the above scaling ratio may include, but not limited to, at least one of: a ratio of a number of pixels (or a size) of the length of the image currently presented on the target device to a number of pixels (or a size) of the length of the original image of this image; a ratio of a number of pixels (or a size) of the width of the image currently presented on the target device to a number of pixels (or a size) of the width of the original image of this image; a ratio of a number of pixels (or a length) of a diagonal line of the image currently presented on the target device to a number of pixels (or a length) of a diagonal line of the original image of this image; or a ratio of a total number of pixels of the image currently presented on the target device to a total number of pixels of the original image of this image. It may be appreciated that a technician may set the approach to determine the scaling ratio by himself. In some situations, when the target device does not present an image currently, the technician or the user may set the above scaling ratio by himself, for example, set the scaling ratio to 100% (i.e., the same as the dimension of the original image), or the technician or the user may set the above scaling ratio according to the viewport size of the target device. For example, when the viewport size of the target device is small (e.g., 800×400), the scaling ratio may be 50%. When the viewport size of the target device is large (e.g., 1920×1080), the scaling ratio may be 100%.

Step 202, determining, in a predetermined to-be-presented image set, a to-be-presented image matching the viewport size and the scaling ratio as a target to-be-presented image.

In this embodiment, the above executing body may determine, in the predetermined to-be-presented image set, the to-be-presented image matching the viewport size and the scaling ratio acquired in step 201 as the target to-be-presented image. Here, the to-be-presented image set may include a plurality of images, many of which may be a combination of arbitrary images or may be a set of images obtained by performing image scaling and/or image segmentation on one image or several images. The target to-be-presented image may be a to-be-presented image in the to-be-presented image set that is determined by the above executing body according to the viewport size and the scaling ratio and is suitable for presentation by the target device.

As an example, the above target to-be-presented image may be a to-be-presented image that is determined by the technician according to experience and ensures that the image presented by the target device has certain definition and has a loading speed faster than the speed at which other high-definition to-be-presented images are loaded. In practice, the technician may set a table or a formula including a corresponding relationship of the viewport size, the scaling ratio and the target to-be-presented image (or the resolution of the image), and thus, the above executing body may determine the to-be-presented image matching the viewport size and the scaling ratio.

In some use situations, the to-be-presented image set includes different images obtained after images are scaled. Differences between the different images may include a difference between resolutions and a difference between storage spaces occupied by the images.

Here, the to-be-presented image set may be determined by the above executing body or other electronic devices.

Step 203, loading the target to-be-presented image.

In this embodiment, the above executing body may load the target to-be-presented image from a cache, a memory, a magnetic disk or other storage devices communicated with the executing body.

Figure 3A:
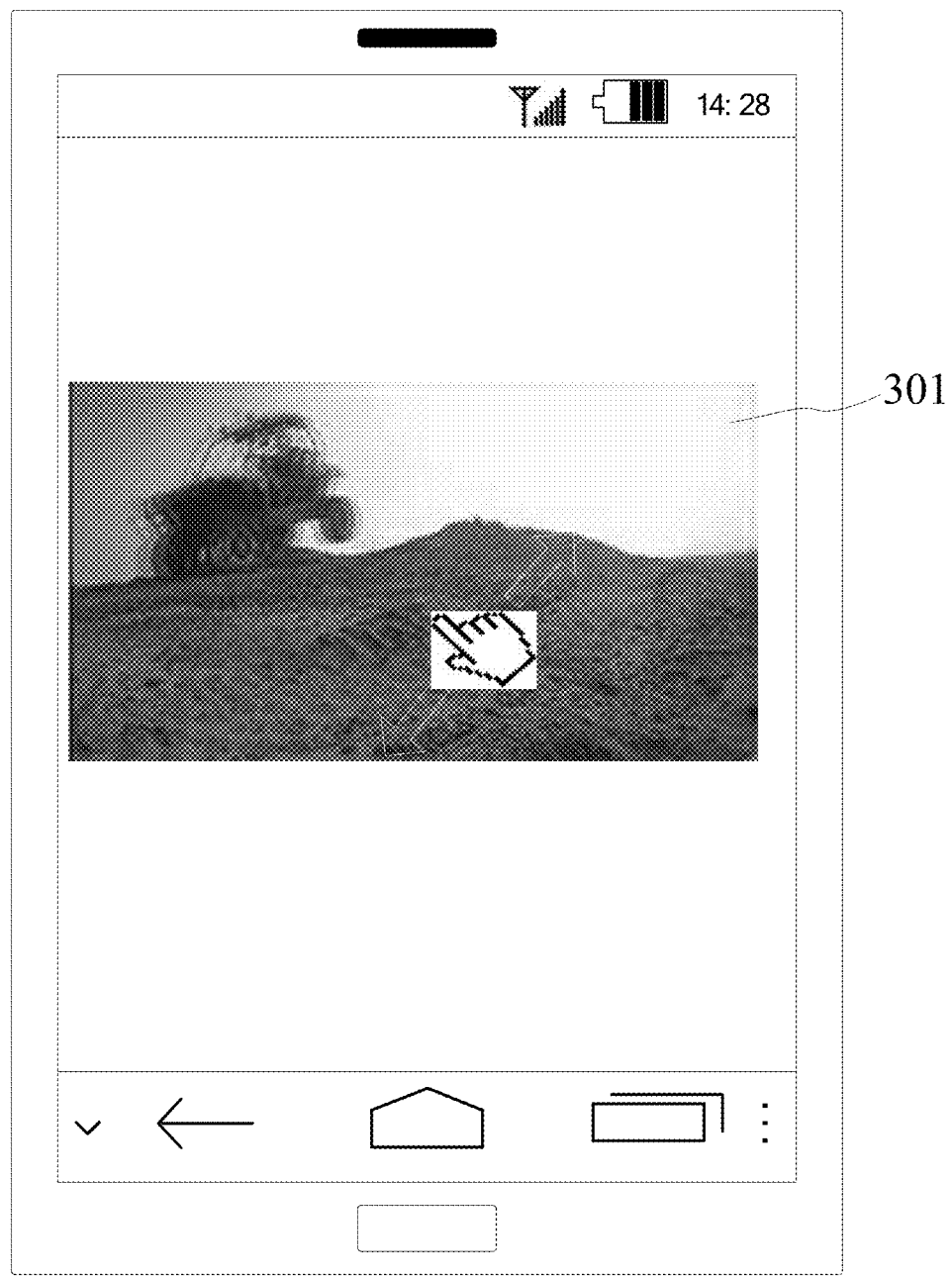
FIG. 3A and FIG. 3B are schematic diagrams of an application scenario of the method for loading an image according to the present disclosure.
Figure 3B:
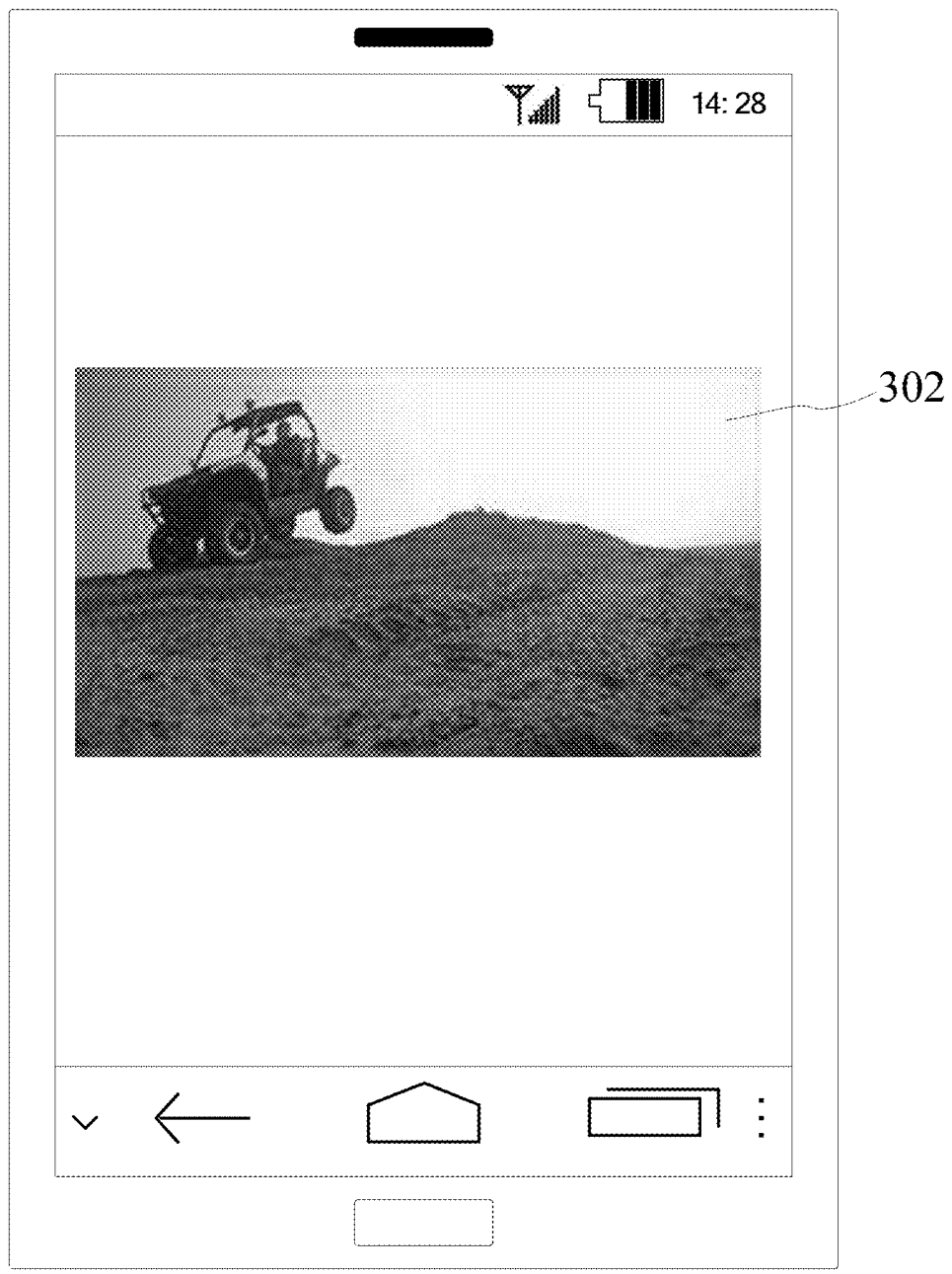

Further referring to FIGS. 3A to 3B, FIG. 3A and FIG. 3B are schematic diagrams of an application scenario of the method for loading an image according to this embodiment. As shown in FIG. 3A, first, the terminal device (i.e., the above executing body) acquires the viewport size (e.g., 1k resolution size) of the terminal device itself (i.e., the target device) and the scaling ratio (e.g., 400%) of the image 301 presented on the terminal device itself with respect to the original dimension of the image. Subsequently, the terminal device determines, in the predetermined to-be-presented image set, the to-be-presented image matching the viewport size and the scaling ratio as the target to-be-presented image. As an example, the to-be-presented image set includes an image with the original resolution (i.e., the original image of a certain image), an image with the original resolution magnified by 2 times (i.e., an image after the certain image is magnified by 2 times), an image with the original resolution magnified by 4 times (i.e., an image after the certain image is magnified by 4 times), and an image with the original resolution shrunk by 2 times (i.e., an image after the certain image is shrunk by 2 times). Here, since the viewport size is not changed, the terminal device determines an image (i.e., an image with the original resolution magnified by 4 times) having the same scaling ratio as the scaling ratio as the target to-be-presented image. Finally, the terminal device loads the target to-be-presented image 302 (as shown in FIG. 3B).

In some alternative implementations of this embodiment, the loading the target to-be-presented image includes: loading the target to-be-presented image from a cache and presenting the target to-be-presented image. It may be appreciated that, after loading the target to-be-presented image for the first time, the executing body may store the target to-be-presented image loaded for the first time into the cache. When the target to-be-presented image is loaded again, the executing body may directly load the target to-be-presented image from the cache. Since the cache runs faster than the memory, loading the target to-be-presented image from the cache helps to increase the speed at which the above executing body presents the target to-be-presented image.

In some alternative implementations of this embodiment, when detecting a target operation for the target to-be-presented image, the above executing body may further re-determine, in the predetermined to-be-presented image set, a to-be-presented image as the target to-be-presented image based on the target operation. Here, the target operation may include, but not limited to, at least one of: an image switching operation, an image dragging operation, an image scaling operation, or a full screen triggering operation.

Here, when the target operation includes the image switching operation, the above executing body may re-determine, in the to-be-presented image set, a to-be-presented image on which the switching indicated by the image switching operation is performed as the target to-be-presented image. When the image switching operation refers to the operation of switching an interior-exterior view image of an object, the above executing body may perform the operation of switching the interior-exterior view image of the object. Thus, as compared with the separate presentation for an interior view image or an exterior view image, switching the interior-exterior view image may show the object overall through the interior view image and the exterior view image of the object, thereby enriching the forms of showing the image. When the target operation includes the image dragging operation, and the to-be-presented image set includes an image block obtained by performing the image segmentation on an image, the above executing body may re-determine, in the to-be-presented image set, a to-be-presented image (i.e., an image block) on which the dragging indicated by the image dragging operation is performed as the target to-be-presented image. When the target operation includes the image scaling operation, the above executing body may re-determine, in the to-be-presented image set, a to-be-presented image as the target to-be-presented image, according to a scaling ratio indicated by the image scaling operation with respect to the original image. When the target operation includes the full screen triggering operation, the above executing body may re-determine, in the to-be-presented image set, a to-be-presented image as the target to-be-presented image, according to the ratio of the size of the display area of an image before a full screen operation to the size of the display area of the image after the full screen operation.

It may be appreciated that, after detecting the target operation, the above executing body re-determines the target to-be-presented image, which helps to adjust the presented image in time to ensure the browsing experience of the user, and helps to ensure the clarity of the presented image to assist the user to view the detail features of the image (e.g., whether blemishes, defects, etc. are present).

In some alternative implementations of this embodiment, the above executing body may further present a transition animation before completing the loading of the re-determined target to-be-presented image, and then present the re-determined target to-be-presented image. Here, the above transition animation may be used for the transition from an image to the next image to connect the two images. The above transition animation may be, but not limited to, gradually slowing down, a uniform transition effect, an accelerated transition effect, a decelerated transition effect, acceleration and then deceleration, and the like. As an example, the technician may set the above transition animation through the CSS (Cascading Style Sheets) 3 or other techniques.

It may be appreciated that, connecting the two images through the transition animation may make the image switching more natural, which enriches the forms of switching the image, and helps to improve the browsing experience of the user.

In some alternative implementations of this embodiment, the above executing body may further present predetermined image information of an area image in the situation where an information triggering operation for the area image in the target to-be-presented image is detected. Here, the above information triggering operation may be an operation or a group of operation sequences. As an example, the above information triggering operation may include, but not limited to, at least one of a touch click, a mouse click, a handle click, input information, or the like. The image information may include, but not limited to, introduction information for the area image, warning information and image switching information. The image information may be presented in at least one of the following forms: text, audio, picture or video. When the target to-be-presented image is a scenic spot image, the introduction information for the above area image may be used to introduce a corresponding area of the scenic spot. When the target to-be-presented image is an image of an object such as an automobile, the warning information of the above area image may be used to prompt that the object area corresponding to a corresponding area is dangerous or flawed. When a set of target to-be-presented images includes an interior view image or an exterior view image of the automobile, the image switching information may be information for representing that the currently shown image is the interior view image or the exterior view image.

In practice, the area image in each to-be-presented image of the set of target to-be-presented images may correspond to image information, and the area image and the image information may be associated and stored in a database or a table, and thus, the above executing body may determine the image information and present the image information.

It may be appreciated that, in the situation the information triggering operation for the area image in the target to-be-presented image is detected, presenting the predetermined image information of the area image may realize the interaction between the user and the above executing body. Thus, for the requirements of the user, the information may be presented to the user with pertinence.

In some alternative implementations of this embodiment, the to-be-presented images in the to-be-presented image set are stored in a predetermined format. Here, the above predetermined format may be a format in which the storage spaces occupied by the to-be-presented images decrease from large to small or decrease from small to large. When the to-be-presented image set includes an image block obtained after the image scaling and/or the image segmentation is performed on the image, the technician may pre-determine the above format in a certain position order (e.g., a position order from top to bottom or a position order from left to right) and a resolution size order (e.g., an order in which the resolution is from large to small), according to the position of the image block in the original image and the resolution of the image block located at the corresponding position of the original image. In practice, the above format may be a JSON (JavaScript Object Notation) format, an XML (Extensible Markup Language) format or the like.

According to the method provided in the above embodiment of the present disclosure, the viewport size of the target device and the scaling ratio of the image presented on the target device with respect to the original dimension of the image are first acquired. Then, in the predetermined to-be-presented image set, the to-be-presented image matching the viewport size and the scaling ratio is determined as the target to-be-presented image. Finally, the target to-be-presented image is loaded. Thus, the forms of loading the image are enriched, which helps to improve the loading speed of the image under the premise that the resolution of the image is ensured.

Figure 4:
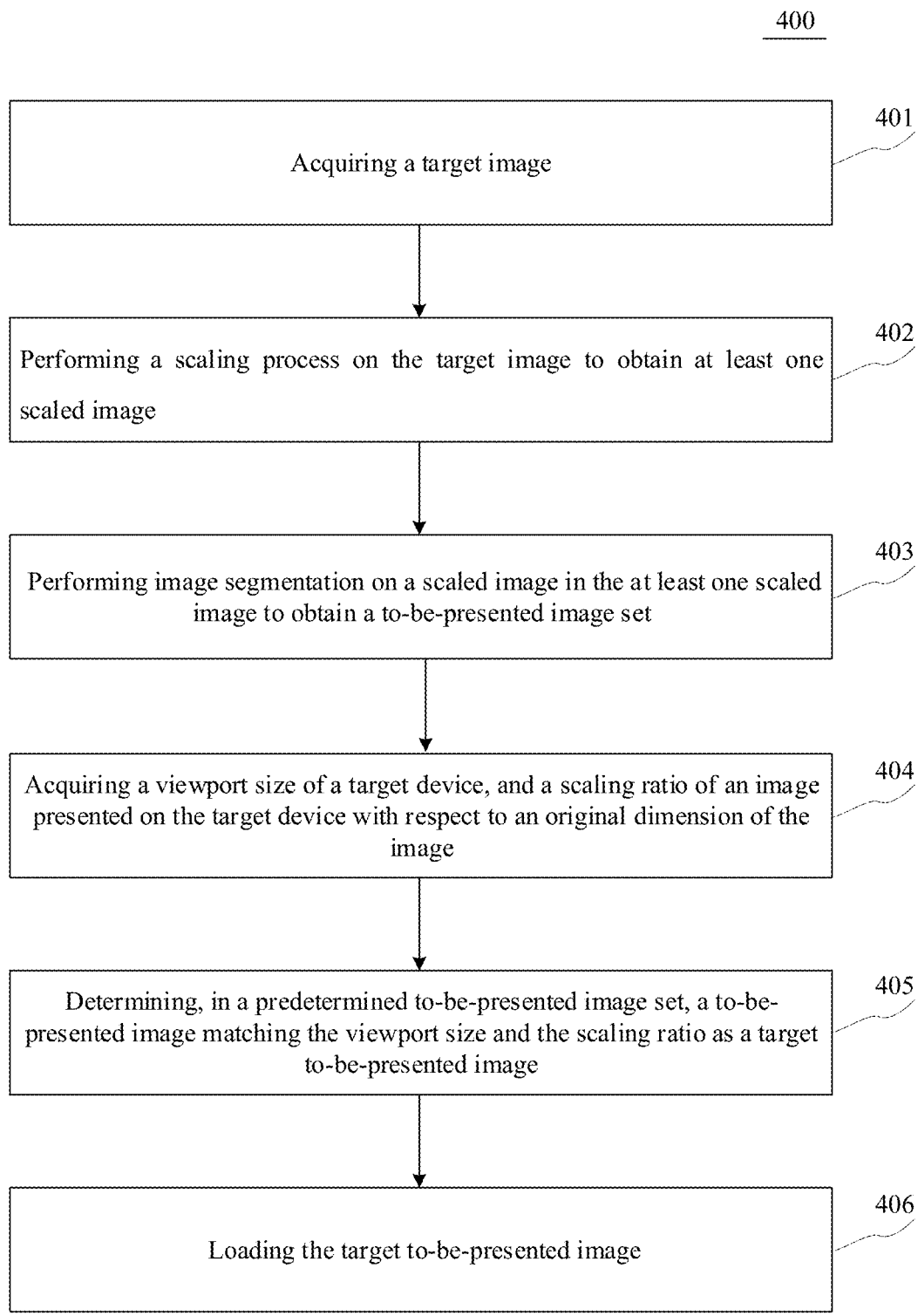
FIG. 4 is a flowchart of another embodiment of the method for loading an image according to the present disclosure.

Further referring to FIG. 4, FIG. 4 illustrates a flow 400 of another embodiment of the method for loading an image. The flow 400 of the method for loading an image includes the following steps.

Step 401, acquiring a target image.

In this embodiment, an executing body (e.g., the server or the terminal devices shown in FIG. 1) of the method for loading an image may acquire the target image locally or from other electronic devices by means of a wired connection or a wireless connection. Here, the target image may be any image. For example, the above target image may include, but not limited to, at least one of: a vehicle image (e.g., an interior view image and an exterior view image of an automobile), a scenic spot image (e.g., an image of the Yellow Crane Tower), a model room image, or the like. The above target image may be a picture or a video frame. The target image may be one image or a plurality of images. The target image may be an image of any size and any length-to-width ratio.

In some alternative implementations of this embodiment, the target image includes an exterior view image group of a target object and an interior view image of the target object. Here, the target object may be an object having an external structure and an internal structure that may be for the user to be viewed, for example, a single landscape (e.g., a model room and the Yellow Crane Tower), or may be a yacht, an automobile, a steam ship or the like. The exterior view image group is obtained by photographing the target object using a panoramic camera. The interior view image is an equidistant cylindrical projection image obtained by photographing around the target object and stitching images obtained through the photographing.

As an example, the exterior view image group may be obtained as follows.

The exterior view image group is obtained by photographing uniformly around the target object in a circle with the target object as a center of the circle (which may alternatively be a position around the target object) and a certain fixed distance (e.g., 5 meters or 3 meters) as a radius and at every interval of a certain angle (e.g., 15 degrees or 30 degrees). Here, the plane formed by surrounding the target object may be parallel to the ground or may be perpendicular to the ground. Alternatively, the exterior view image group may also include exterior view images obtained by photographing around the plane parallel to the ground and the plane perpendicular to the ground.

Alternatively, the executing body or other electronic devices may obtain a plurality of exterior view image groups by determining a plurality of centers of circles, in the above way.

As an example, the interior view image may be obtained as follows.

First, a plurality of images of the interior of the target object are obtained using the panoramic camera at a position inside the target object.

Then, the obtained plurality of images are stitched to obtain the equidistant cylindrical projection image. Here, the above stitching operation is a well-known technique widely studied by a person skilled in the art of panoramic image production, which will not be repeatedly described here.

It may be appreciated that when the above equidistant cylindrical projection image is rendered in a sphere, a panoramic image may be presented. Therefore, according to the embodiment of the present disclosure, the panoramic image may be presented in an online or offline state, and as compared with the experience of the user entity, the cost of the user may be reduced, and the time of the user may be saved.

In some alternative implementations of this embodiment, the size of each exterior view image in the exterior view image group and the size of the interior view image are predetermined respectively.

As an example, the width of the each exterior view image in the exterior view image group and the width of the interior view image may be 8k (or other values) pixels, the length-to-width ratio of the exterior view image may be 16:9 (or other ratios), and the length-to-width ratio of the interior view image may be 2:1 (or other ratios).

It may be appreciated that, after the size of the each exterior view image in the exterior view image group and the size of the interior view image are predetermined, the subsequent step of performing the scaling process and/or the segmentation process on target images (i.e., the interior view image and the exterior view image) may be simplified, which helps to improve the speed of the scaling process and/or the segmentation process.

Step 402, performing a scaling process on the target image to obtain at least one scaled image.

In this embodiment, the above executing body may perform the scaling process on the target image to obtain at least one scaled image. Here, the scaling process may include a shrinking process or a magnifying process. It may be appreciated that the there are differences in resolution (definition) and resource occupancy rate (and the size of the storage space occupied by the image) between the target image (i.e., the scaled image) obtained after the scaling process and the target image before the scaling process. The obtained scaled image may include the target image, or may not include the target image.

Here, the scaling ratio when the scaling process is performed on the target image may be preset, or may be determined according to the resolution (definition) and/or the resource occupancy rate (i.e., the size of the storage space occupied by the image) of the current target image.

In some alternative implementations of this embodiment, step 402 may include: performing the scaling process on the each exterior view image and the interior view image respectively according to at least one preset scaling ratio, to obtain the at least one scaled image. Here, the above at least one scaling ratio may refer to various predetermined scaling ratios. The above scaling ratios may include, but not limited to, at least one of: a ratio of a number of pixels of the length of the scaled image to a number of pixels of the length of the original image of the scaled image; a ratio of a number of pixels of the width of the scaled image to a number of pixels of the width of the original image of the scaled image; a ratio of a number of pixels of a diagonal line of the scaled image to a number of pixels of the diagonal line of the original image of the scaled image; or a ratio of a total number of pixels of the scaled image to a total number of pixels of the original image of the scaled image. As an example, the at least one preset scaling ratio may include, but not limited to, at least one of: 200%, 100%, 50%, 25% or 12.5%.

Here, as an example, when the width of the each exterior view image in the exterior view image group and the width of the interior view image are 8k pixels, the length-to-width ratio of the exterior view image is 16:9, and the length-to-width ratio of the interior view image is 2:1, the above executing body may obtain the at least one scaled image through the following steps.

When the length-to-width ratio is maintained, the scaling process is respectively performed on each image (each exterior view image in the exterior view image group and the interior view image) in the situation where the width of the image is 512 pixels, 1k pixels, 2k pixels, 4k pixels and 8k pixels, respectively, to obtain the at least one scaled image. Here, since the number of preset scaling ratios is 5, the number of scaled images is 5 times the sum of the number of interior view images and the number of exterior view image. That is, the ratio of the number of the scaled images to the sum of the number of the interior view images and the number of the exterior view image may be the same as the number of the preset scaled ratios.

Step 403, performing image segmentation on a scaled image in the at least one scaled image to obtain a to-be-presented image set.

In this embodiment, the above executing body may perform the image segmentation on the scaled image in the at least one scaled image to obtain the to-be-presented image set. Here, the image segmentation is a process of dividing an image into several specific areas. The image segmentation technique is a well-known technique widely studied by a person skilled in the art of image processing, which will not be repeatedly described here. In practice, the size (specification) in which the scaled image is divided may be predetermined, or may be determined according to the resolution (definition) and/or the resource occupancy rate (i.e., the size of the storage space occupied by the scaled image) of the scaled image.

Here, the above executing body may perform the image segmentation on each scaled image in the at least one scaled image, or may perform the image segmentation on a scaled image meeting a condition in the at least one scaled image, thereby obtaining the to-be-presented image set. Here, the above condition may be a condition set by a technician according to a requirement. For example, the above condition may refer to that the storage space occupied by the scaled image is larger than a preset threshold value (e.g., 1 M, 2 M, etc.).

In some use situations, step 403 may include: performing the image segmentation on each scaled image in the at least one scaled image respectively according to a preset size, to obtain the to-be-presented image set. As an example, the preset size may be a square having a length of 256 pixels and a width of 256 pixels, a rectangle having a length of 256 pixels and a width of 128 pixels, or other sizes.

Step 404, acquiring a viewport size of a target device, and a scaling ratio of an image presented on the target device with respect to an original dimension of the image.

Step 405, determining, in a predetermined to-be-presented image set, a to-be-presented image matching the viewport size and the scaling ratio as a target to-be-presented image.

Step 406, loading the target to-be-presented image.

In this embodiment, steps 404-406 are substantially identical to steps 201-203 in the corresponding embodiment of FIG. 2, which will not be repeatedly described here.

Figure 5A:
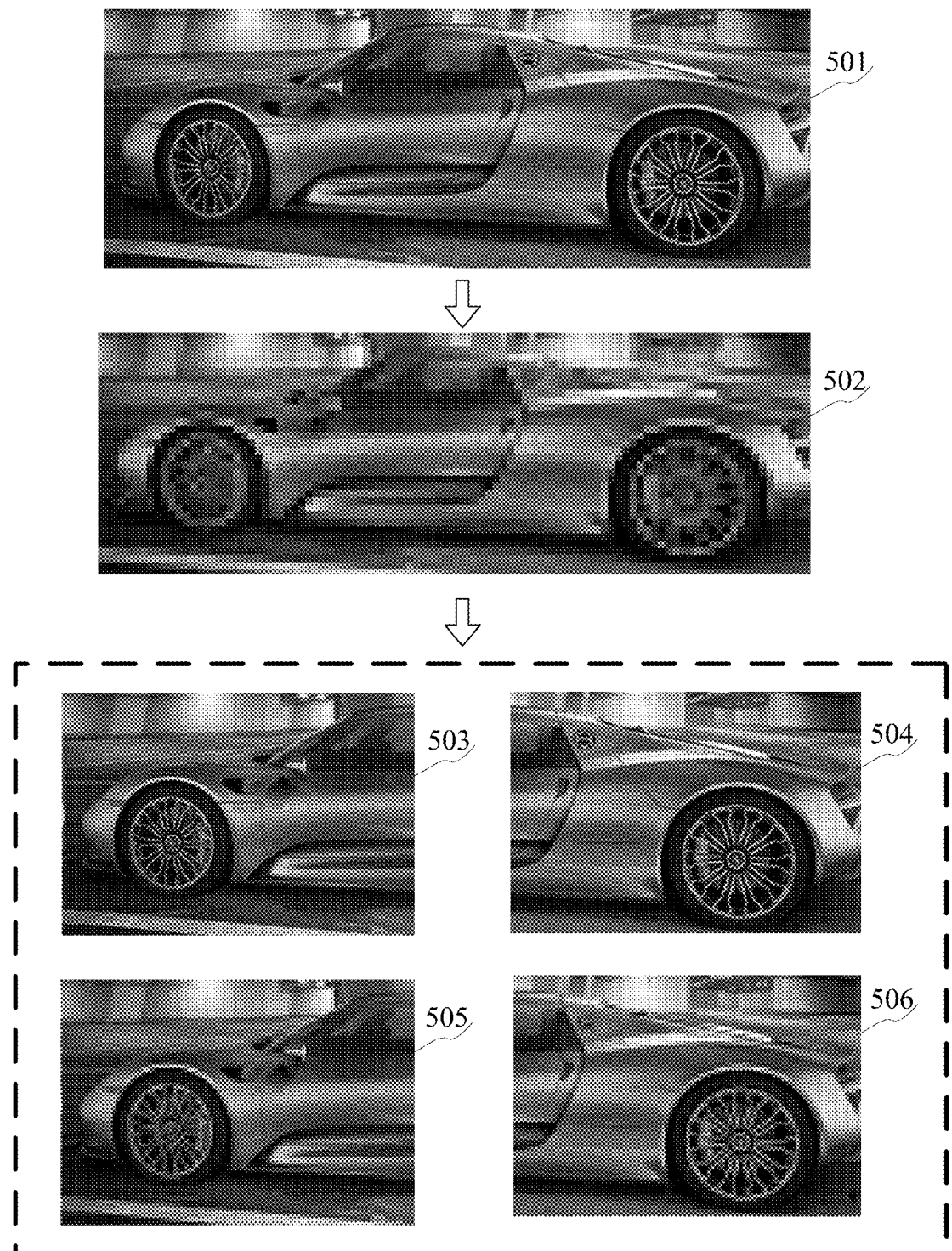
FIG. 5A to FIG. 5C are schematic diagrams of another application scenario of the method for loading an image according to the present disclosure.
Figure 5B:
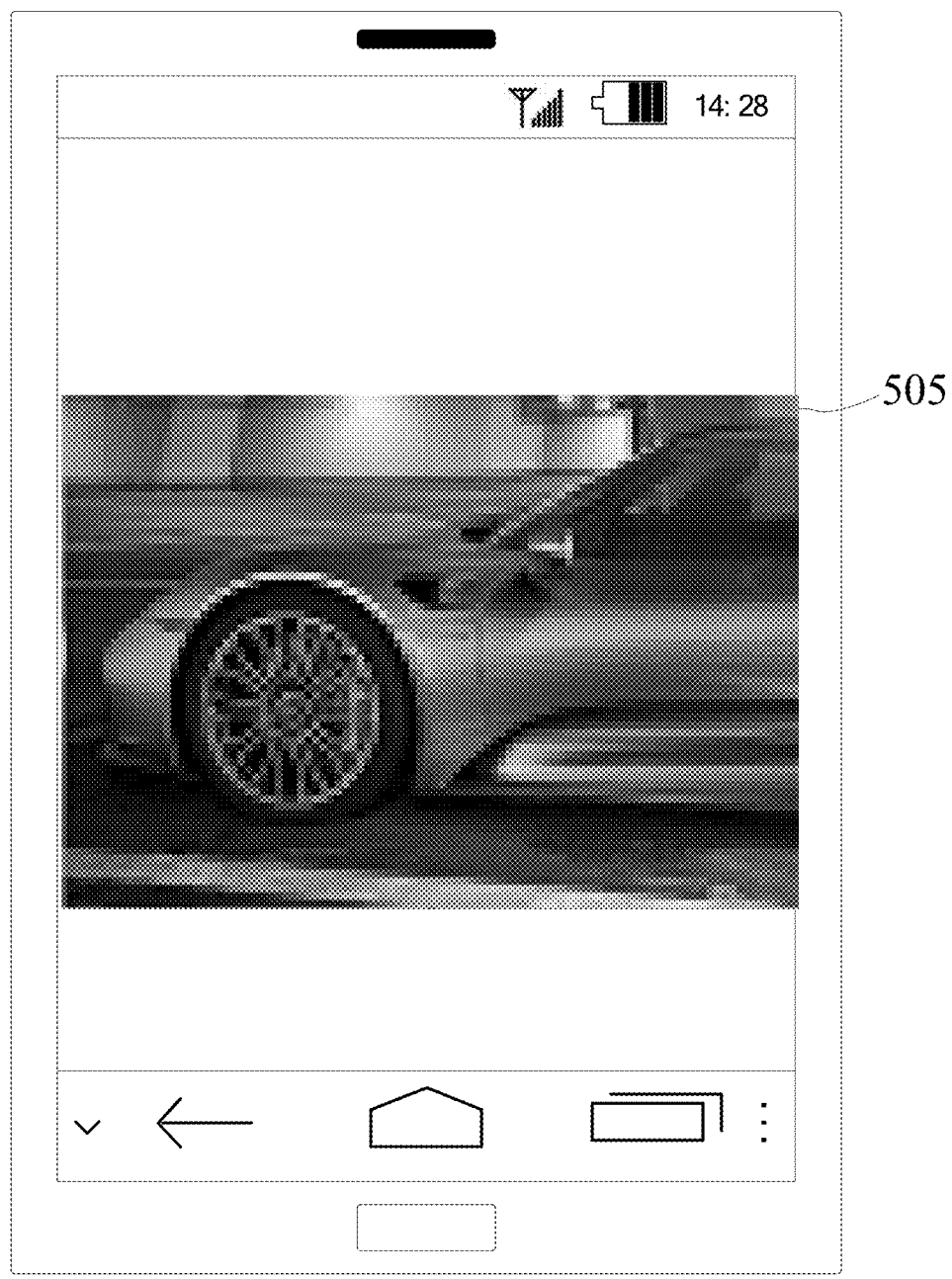
Figure 5C:
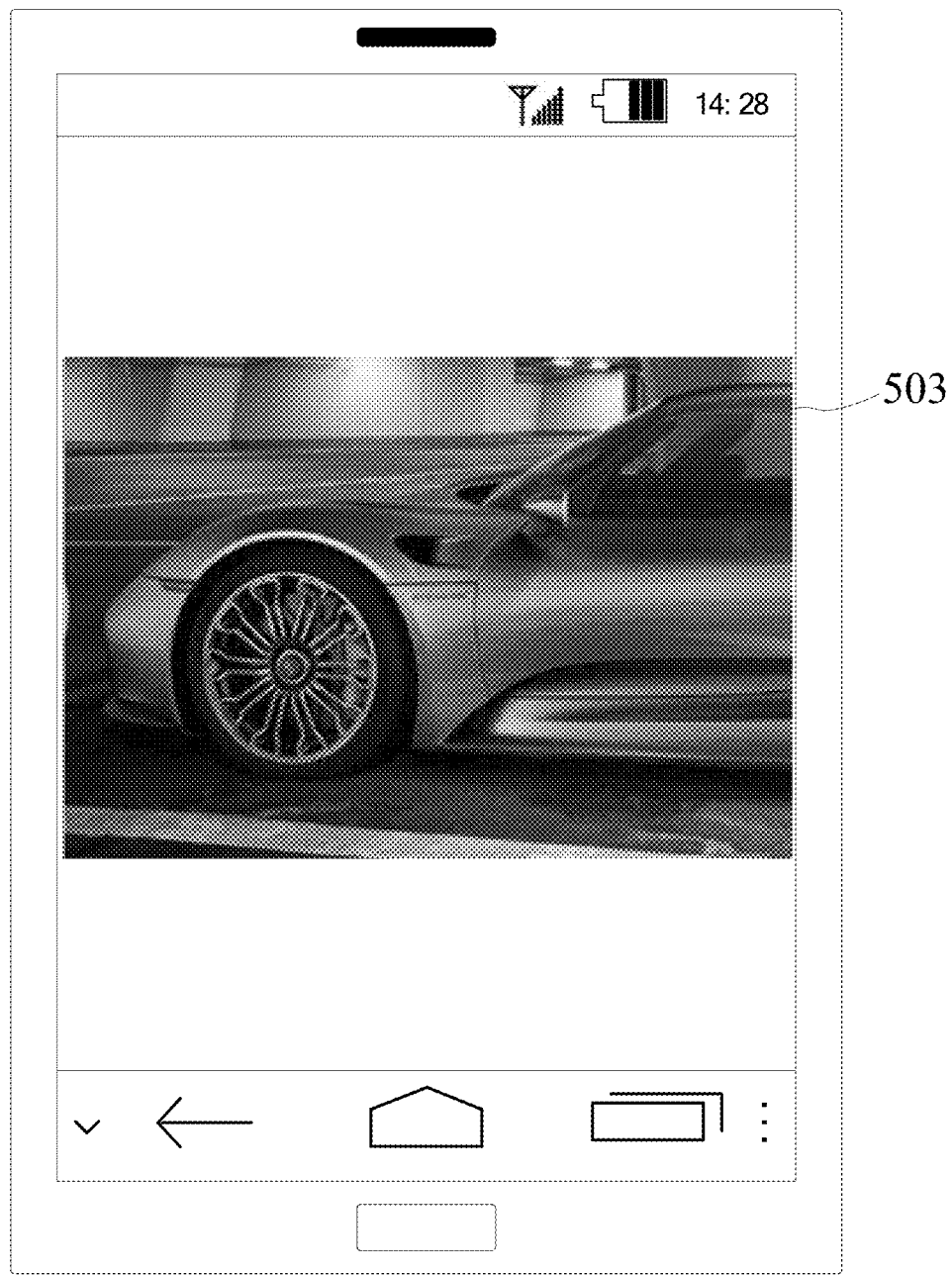

Further referring to FIGS. 5A-5C, FIGS. 5A-5C are schematic diagrams of another application scenario of the method for loading an image according to this embodiment. As shown in FIG. 5A, the electronic device acquires the target image 501. Then, the electronic device performs the scaling process on the target image to obtain at least one scaled image (as shown in FIG. 5A, the at least one scaled image includes the scaled image 501 and the scaled image 502), and then the electronic device performs the image segmentation on a scaled image in the at least one scaled image to obtain a to-be-presented image set (as shown in FIG. 5A, the to-be-presented image set includes the to-be-presented images 503, 504, 505 and 506). Subsequently, referring to FIG. 5B, a terminal device (which may be the above electronic device or may be other electronic devices different from the above electronic device) acquires a viewport size (e.g., 1k resolution size) of the target device (i.e., the terminal device in FIG. 5B) and a scaling ratio (e.g., 400%) of the image (i.e., the to-be-presented image 505) presented on the target device with respect to the original dimension of the image. Next, the terminal device determines, in the predetermined to-be-presented image set, the to-be-presented image matching the viewport size and the scaling ratio as the target to-be-presented image (i.e., the to-be-presented image 503). Finally, as shown in FIG. 5C, the terminal device loads the target to-be-presented image (i.e., the to-be-presented image 503).

It may be seen from FIG. 4 that, as compared with the embodiment corresponding to FIG. 2, the flow 400 of the method for loading an image in this embodiment emphasizes step of determining the to-be-presented image set. As a result, through more approaches of determining the to-be-presented image set, the scheme described in this embodiment may improve the image loading speed under the premise that the resolution of the image is ensured.

Figure 6:
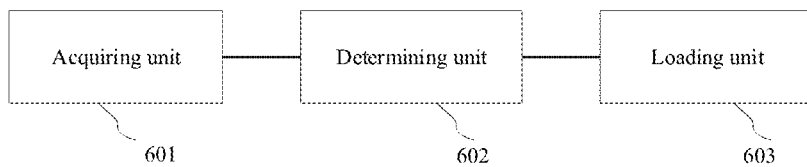
FIG. 6 is a schematic structural diagram of an embodiment of an apparatus for loading an image according to the present disclosure.

Further referring to FIG. 6, as an implementation of the method shown in the above drawings, the present disclosure provides an embodiment of an apparatus for loading an image. The embodiment of the apparatus corresponds to the embodiment of the method shown in FIG. 2, and the embodiment of the apparatus may further include the features and effects identical or corresponding to the embodiment of the method shown in FIG. 2, in addition to the features and effects described below. The apparatus may be applied in various electronic devices.

As shown in FIG. 6, the apparatus 600 for loading an image in this embodiment includes an acquiring unit 601, a determining unit 602 and a loading unit 603. Here, the acquiring unit 601 is configured to acquire a viewport size of a target device, and a scaling ratio of an image presented on the target device with respect to an original dimension of the image. The determining unit 602 is configured to determine, in a predetermined to-be-presented image set, a to-be-presented image matching the viewport size and the scaling ratio as a target to-be-presented image. The loading unit 603 is configured to load the target to-be-presented image.

In this embodiment, the acquiring unit 601 of the apparatus 600 for loading an image may acquire the viewport size of the target device and the scaling ratio of the image presented on the target device with respect to the original dimension of the image, by means of a wired connection or a wireless connection. When the above apparatus 600 is a terminal device, the above apparatus 600 may acquire the viewport size of the device (i.e., the target device) and the scaling ratio of the image presented on the apparatus 600 itself (i.e., the target device) with respect to the original dimension of the image from the apparatus 600 itself (i.e., the target device). When the above apparatus 600 is a server, the above apparatus 600 may acquire, from a terminal device (i.e., the target device) communicated with the apparatus 600, the viewport size of the terminal device (i.e., the target device) communicated with the apparatus 600 and the scaling ratio of the image presented on the terminal device (i.e., the target device) communicated with the apparatus 600 with respect to the original dimension of the image.

In this embodiment, the target device may be the apparatus 600 itself, or may be other devices communicated with the above apparatus 600. The viewport size may be related to the screen of the electronic device, or may be related to the window size presented by the electronic device. The target device may be a device for interacting with a user.

In this embodiment, the above determining unit 602 may determine, in the predetermined to-be-presented image set, the to-be-presented image matching the viewport size and the scaling ratio acquired by the acquiring unit 601 as the target to-be-presented image. Here, the to-be-presented image set may include a plurality of images, many of which may be a combination of arbitrary images or may be a set of images obtained by performing image scaling and/or image segmentation on one image or several images. The target to-be-presented image may be a to-be-presented image in the to-be-presented image set that is determined by the above apparatus 600 according to the viewport size and the scaling ratio and is suitable for presentation by the target device.

In this embodiment, the above loading unit 603 may load the target to-be-presented image from a cache, a memory, a magnetic disk or other storage devices communicated with the apparatus 600.

In some alternative implementations of this embodiment, the to-be-presented image set is determined by the above apparatus 600 or other apparatuses through the following steps.

First, a target image is acquired locally or from other electronic devices by means of a wired connection or a wireless connection. Here, the target image may be any image. For example, the above target image may include, but not limited to, at least one of: a vehicle image (e.g., an interior view image and an exterior view image of an automobile), a scenic spot image (e.g., an image of the Yellow Crane Tower), a model room image, or the like. The above target image may be a picture or a video frame. The target image may be one image or a plurality of images. The target image may be an image of any size and any length-to-width ratio.

Then, a scaling process is performed on the target image to obtain at least one scaled image. Here, the scaling process may include a shrinking process or a magnifying process. It may be appreciated that the there are differences in resolution (definition) and resource occupancy rate (and the size of the storage space occupied by the image) between the target image (i.e., the scaled image) obtained after the scaling process and the target image before the scaling process. The obtained scaled image may include the target image, or may not include the target image.

Finally, the image segmentation is performed on a scaled image in the at least one scaled image to obtain the to-be-presented image set. Here, the image segmentation is a process of dividing an image into several specific areas. The image segmentation technique is a well-known technique widely studied by a person skilled in the art of image processing, which will not be repeatedly described here. In practice, the size (specification) in which the scaled image is divided may be predetermined, or may be determined according to the resolution (definition) and/or the resource occupancy rate (i.e., the size of the storage space occupied by the scaled image) of the scaled image.

In some alternative implementations of this embodiment, the target image includes an exterior view image group of a target object and an interior view image of the target object. Here, the target object may be any object, for example, a single landscape (e.g., a model room and the Yellow Crane Tower), or may be a yacht, an automobile, a steam ship or the like. The exterior view image group is obtained by photographing the target object using a panoramic camera. An interior view image is an equidistant cylindrical projection image obtained by photographing around the target object and stitching images obtained through the photographing.

In some alternative implementations of this embodiment, the size of each exterior view image in the exterior view image group and the size of the interior view image are predetermined respectively.

In some alternative implementations of this embodiment, performing the scaling process on the target image to obtain the at least one scaled image includes: performing the scaling process on the each exterior view image and the interior view image respectively according to at least one preset scaling ratio, to obtain the at least one scaled image. Here, the above at least one scaling ratio may refer to various predetermined scaling ratios. The above scaling ratios may include, but not limited to, at least one of: a ratio of a number of pixels of the length of the scaled image to a number of pixels of the length of the original image of the scaled image; a ratio of a number of pixels of the width of the scaled image to a number of pixels of the width of the original image of the scaled image; a ratio of a number of pixels of a diagonal line of the scaled image to a number of pixels of the diagonal line of the original image of the scaled image; or a ratio of a total number of pixels of the scaled image to a total number of pixels of the original image of the scaled image. As an example, the at least one preset scaling ratio may include, but not limited to, at least one of: 200%, 100%, 50%, 25% or 12.5%.

In some alternative implementations of this embodiment, performing the image segmentation on the scaled image in the at least one scaled image to obtain the to-be-presented image set includes: performing the image segmentation on each scaled image in the at least one scaled image respectively according to a preset size, to obtain the to-be-presented image set. As an example, the preset size may be a square having a length of 256 pixels and a width of 256 pixels, a rectangle having a length of 256 pixels and a width of 128 pixels, or other sizes.

In some alternative implementations of this embodiment, the loading unit 603 is further configured to load the target to-be-presented image from a cache and present the target to-be-presented image.

It may be appreciated that, after loading the target to-be-presented image for the first time, the above apparatus 600 may store the target to-be-presented image loaded for the first time into the cache. When the target to-be-presented image is loaded again, the above apparatus 600 may directly load the target to-be-presented image from the cache. Since the cache runs faster than the memory, loading the target to-be-presented image from the cache helps to increase the speed at which the above apparatus 600 presents the target to-be-presented image.

In some alternative implementations of this embodiment, the apparatus 600 further includes a re-determining unit (not shown in the figure) configured to, in response to detecting a target operation for the target to-be-presented image, re-determine, in the to-be-presented image set, a to-be-presented image as the target to-be-presented image based on the target operation. Here, the target operation includes at least one of: an image switching operation, an image dragging operation, an image scaling operation, or a full screen triggering operation.

In some alternative implementations of this embodiment, the apparatus 600 further includes a first presenting unit (not shown in the figure) configured to present a transition animation before loading of the re-determined target to-be-presented image is completed; and a second presenting unit (not shown in the figure) configured to present the re-determined target to-be-presented image. Here, the above transition animation may be used for the transition from an image to the next image to connect the two images. The above transition animation may be, but not limited to, gradually slowing down, a uniform transition effect, an accelerated transition effect, a decelerated transition effect, acceleration and then deceleration, and the like. As an example, the technician may set the above transition animation through the CSS (Cascading Style Sheets) 3 or other techniques.

In some alternative implementations of this embodiment, the apparatus 600 further includes a third presenting unit (not shown in the figure) configured to present, in response to detecting an information triggering operation for an area image in the target to-be-presented image, predetermined image information of the area image. Here, the above information triggering operation may be an operation or a group of operation sequences.

In some alternative implementations of this embodiment, the to-be-presented images in the to-be-presented image set are stored in a predetermined format. Here, the above predetermined format may be a format in which the storage spaces occupied by the to-be-presented images decrease from large to small or decrease from small to large. When the to-be-presented image set includes an image block obtained after the image scaling and/or the image segmentation is performed on the image, the technician may predetermine the above format in a certain position order (e.g., a position order from top to bottom or a position order from left to right) and a resolution size order (e.g., an order in which the resolution is from large to small), according to the position of the image block in the original image and the resolution of the image block located at the corresponding position of the original image. In practice, the above format may be a JSON format, an XML format or the like.

According to the device provided in the above embodiment of the present disclosure, the acquiring unit 601 acquires the viewport size of the target device and the scaling ratio of the image presented on the target device with respect to the original dimension of the image. Then, the determining unit 602 determines, in the predetermined to-be-presented image set, the to-be-presented image matching the viewport size and the scaling ratio as the target to-be-presented image. Finally, the loading unit 603 loads the target to-be-presented image. Thus, the forms of loading the image are enriched, which helps to improve the loading speed of the image under the premise that the resolution of the image is ensured.

Figure 7:
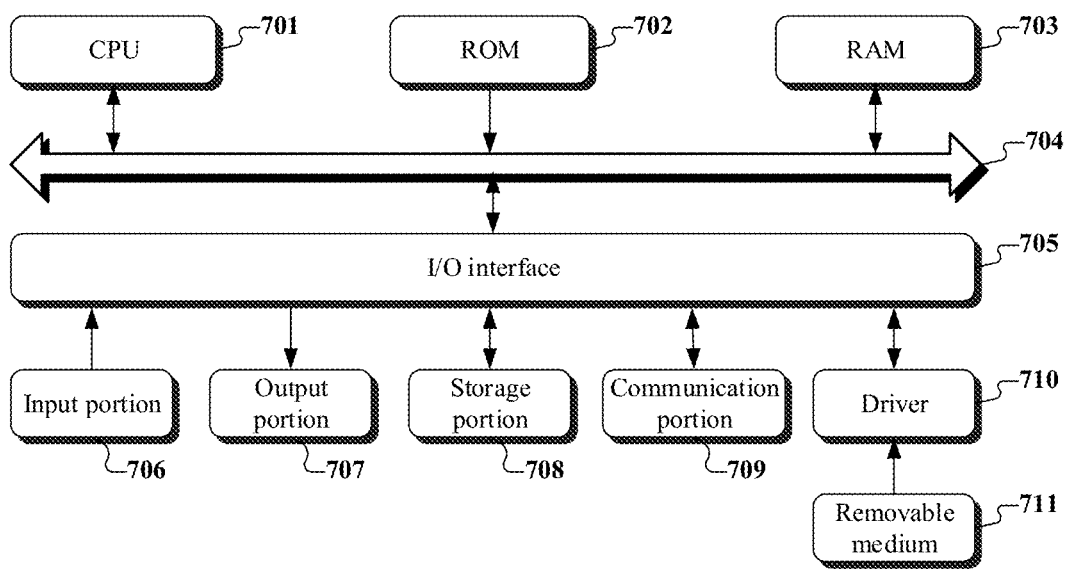
FIG. 7 is a schematic structural diagram of a computer system adapted to implement an electronic device according to embodiments of the present disclosure.

Referring to FIG. 7, FIG. 7 is a schematic structural diagram of a computer system 700 adapted to implement a server according to embodiments of the present disclosure. The server shown in FIG. 7 is merely an example, and should not bring any limitations to the functions and the scope of use of the embodiments of the present disclosure.

As shown in FIG. 7, the computer system 700 may include a processing unit (CPU) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

The following components are connected to the I/O interface 705: an input portion 706 including, for example, a keyboard, and a mouse; an output portion 707 including, for example, a cathode ray tube (CRT), a liquid crystal display (LCD), and a speaker; a storage portion 708 including, for example, a hard disk; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 708, so that a computer program read therefrom is installed on the storage portion 708 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 709, or may be installed from the removable medium 711. The computer program, when executed by the processing unit (CPU) 701, implements the functions as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a determining unit and a loading unit. Here, the names of these units do not in some cases constitute a limitation to such units themselves. For example, the acquiring unit may also be described as "a unit configured to acquire a viewport size of a target device, and a scaling ratio of an image presented on the target device with respect to an original dimension of the image."

In another aspect, the present disclosure further provides a computer-readable medium. The computer-readable storage medium may be included in the apparatus in the above described embodiments, or a stand-alone computer-readable medium not assembled into the apparatus. The computer-readable medium stores one or more programs. The one or more programs, when executed by the apparatus, cause the apparatus to: acquire a viewport size of a target device, and a scaling ratio of an image presented on the target device with respect to an original dimension of the image; determine, in a predetermined to-be-presented image set, a to-bepresented image matching the viewport size and the scaling ratio as a target to-be-presented image; and load the target to-be-presented image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for loading an image, comprising:
    acquiring a viewport size of a target device, and a scaling ratio of an image presented on the target device with respect to an original dimension of the image;
    determining, in a predetermined to-be-presented image set comprising to-be-presented images of different resolutions, a first to-be-presented image matching the viewport size and the scaling ratio as a target to-be-presented image, wherein the target image comprises an interior view image of a target object and an exterior view image group of the target object, the exterior view image group is an equidistant cylindrical projection image obtained by photographing around the target object and stitching images obtained through the photographing, and the interior view image is obtained by photographing the target object using a panoramic camera inside the target object;
    loading the target to-be-presented image;
    presenting the target to-be-presented image;
    detecting an image switching operation; and
    switching between the interior view image of the target object and the exterior view image group of the target object, in response to detecting the image switching operation.

2. The method according to claim 1, wherein the to-be-presented image set is determined by:
    acquiring a target image;
    performing a scaling process on the target image to obtain at least one scaled image; and
    performing image segmentation on a scaled image in the at least one scaled image to obtain the to-be-presented image set.

3. The method according to claim 1, wherein a size of each exterior view image in the exterior view image group and a size of the interior view image are respectively predetermined.

4. The method according to claim 3, wherein the performing a scaling process on the target image to obtain at least one scaled image comprises:
    performing the scaling process on the each exterior view image and the interior view image respectively according to at least one preset scaling ratio, to obtain the at least one scaled image, and
    the performing image segmentation on a scaled image in the at least one scaled image to obtain the to-be-presented image set comprises:
        performing the image segmentation on each scaled image in the at least one scaled image respectively according to a preset size, to obtain the to-be-presented image set.

5. The method according to claim 1, wherein the loading the target to-be-presented image comprises:
    loading the target to-be-presented image from a cache and presenting the target to-be-presented image.

6. The method according to claim 5, further comprising:
    in response to detecting a target operation for the target to-be-presented image, re-determining, in the to-be-presented image set, a to-be-presented image as the target to-be-presented image based on the target operation, wherein the target operation comprises at least one of: an image scaling operation, or a full screen triggering operation.

7. The method according to claim 6, further comprising:
    presenting a transition animation before loading of the re-determined target to-be-presented image is completed; and
    presenting the re-determined target to-be-presented image.

8. The method according to claim 1, further comprising:
    in response to detecting an information triggering operation for an area image in the target to-be-presented image, presenting predetermined image information of the area image.

9. A non-transitory computer readable medium, storing a computer program, wherein the program, when executed by a processor, implements the method according to claim 1.

10. The method according to claim 1, wherein all images in the predetermined to-be-presented image set have a given object.

11. The method according to claim 1, wherein the determining comprises determining, in a pre-set corresponding relationship, a target resolution corresponding to the viewport size and the scaling ratio, and determining, from the predetermined to-be-presented image set, a to-be-presented image having the target resolution as the to-be-presented image matching the viewport size and the scaling ratio, wherein in the pre-set corresponding relationship, each of image resolutions corresponds to a respective viewport size and a respective scaling ratio, wherein the respective viewport size is a size of a screen of an electronic device.

12. The method according to claim 1, wherein the predetermined to-be-presented image set is acquired by:
    acquiring a first given image of a first resolution, the given image including an image of a given object;
    obtaining a second given image of a second resolution by scaling the first given image, the second resolution being different from the first resolution; and
    obtaining a plurality of first segmenting images by segmenting the first given image, each of the plurality of first segmenting image including a first-resolution image of a part of the given object;
    obtaining a plurality of second segmenting images by segmenting the second given image, each of the plurality of second segmenting images including a second-resolution image of the part of the given object; and
    determining the plurality of first segmenting images and the plurality of second segmenting images as the to-be-presented images of the predetermined to-be-presented image set.

13. The method according to claim 1, wherein the method further comprises:

detecting an image dragging operation on a second to-be-presented image other than the first to-be-presented image in the predetermined to-be-presented image set;

transitioning, in response to detecting the image dragging operation on the second to-be-presented image, the first to-be-presented image to the second to-be-presented image;

presenting a transition animation while transitioning the first to-be-presented image to the second to-be-presented image, wherein the transition animation is accelerated and then decelerated while transitioning the first to-be-presented image to the second to-be-presented image.

14. An apparatus for loading an image, comprising:

at least one processor; and a memory storing instructions, wherein the instructions when executed by the at least one processor, cause the at least one processor to perform operations, the operations comprising:

acquiring a viewport size of a target device, and a scaling ratio of an image presented on the target device with respect to an original dimension of the image;

determining in a predetermined to-be-presented image set comprising to-be- presented images of different resolutions, a first to-be-presented image matching the viewport size and the scaling ratio as a target to-be-presented image, wherein the target image comprises an interior view image of a target object and an exterior view image group of the target object, the exterior view image group is an equidistant cylindrical projection image obtained by photographing around the target object and stitching images obtained through the photographing, and the interior view image is obtained by photographing the target object using a panoramic camera inside the target object;

loading the target to-be-presented image;

presenting the target to-be-presented image;

detecting an image switching operation; and switching between the interior view image of the target object and the exterior view image group of the target object, in response to detecting the image switching operation.

15. The apparatus according to claim 14, wherein the to-be-presented image set is determined by:

acquiring a target image;

performing a scaling process on the target image to obtain at least one scaled image; and performing image segmentation on a scaled image in the at least one scaled image to obtain the to-be-presented image set.

16. The apparatus according to claim 14, wherein a size of each exterior view image in the exterior view image group and a size of the interior view image are respectively predetermined.

17. The apparatus according to claim 16, wherein the performing a scaling process on the target image to obtain at least one scaled image comprises:

performing the scaling process on the each exterior view image and the interior view image respectively according to at least one preset scaling ratio, to obtain the at least one scaled image, and the performing image segmentation on a scaled image in the at least one scaled image to obtain the to-be-presented image set comprises:

performing the image segmentation on each scaled image in the at least one scaled image respectively according to a preset size, to obtain the to-be-presented image set.

18. The apparatus according to claim 14, wherein the loading the target to-be-presented image comprises:

loading the target to-be-presented image from a cache and present the target to-be-presented image.

19. The apparatus according to claim 18, wherein the operations further comprise:

in response to detecting a target operation for the target to-be-presented image, re-determining, in the to-be-presented image set, a to-be-presented image as the target to-be-presented image based on the target operation, wherein the target operation comprises at least one of: an image scaling operation, or a full screen triggering operation.

20. The apparatus according to claim 19, wherein the operations further comprise:

presenting a transition animation before loading of the re-determined target to-be-presented image is completed; and presenting the re-determined target to-be-presented image.

* * * * *